US012550132B2

(12) United States Patent
Thubert et al.

(10) Patent No.: US 12,550,132 B2
(45) Date of Patent: Feb. 10, 2026

(54) FLEXIBLE-SLOT SCHEDULING FOR RAW DETERMINISTIC TRAFFIC

(71) Applicant: Cisco Technology, Inc., San Jose, CA (US)

(72) Inventors: Pascal Thubert, Roquefort les Pins (FR); Jerome Henry, Pittsboro, NC (US); Juan Carlos Zuniga, Montreal (CA); Matthew A. Silverman, Shaker Heights, OH (US); Domenico Ficara, Essertines-sur-Yverdon (CH); Amine Choukir, Ecublens (CH); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 468 days.

(21) Appl. No.: 18/192,306

(22) Filed: Mar. 29, 2023

(65) Prior Publication Data

US 2024/0015727 A1 Jan. 11, 2024

Related U.S. Application Data

(60) Provisional application No. 63/368,001, filed on Jul. 8, 2022.

(51) Int. Cl.
*H04W 72/121* (2023.01)
*H04W 72/0446* (2023.01)
(Continued)

(52) U.S. Cl.
CPC ..... *H04W 72/121* (2013.01); *H04W 72/0446* (2013.01); *H04W 72/20* (2023.01); *H04W 84/12* (2013.01)

(58) Field of Classification Search
CPC ........... H04W 72/121; H04W 72/0446; H04W 72/20; H04W 84/12; H04W 74/0816
(Continued)

(56) References Cited

U.S. PATENT DOCUMENTS

| 6,243,369 B1 * | 6/2001 | Grimwood | H04J 13/16 |
| | | | 370/335 |
| 10,735,151 B2 * | 8/2020 | Kim | H04L 5/0053 |

(Continued)

FOREIGN PATENT DOCUMENTS

| GB | 2561616 A | * 10/2018 | ............ H04W 72/21 |
| GB | 2576723 A | * 3/2020 | ........... H04W 74/006 |

(Continued)

OTHER PUBLICATIONS

Boris Bellalta et al., "AP-initiated Mult-User Transmissions in IEEE 802.11ax WLANs," arXiv.org, Dated: Jun. 5, 2018, pp. 1-31.
(Continued)

*Primary Examiner* — Mahendra R Patel
(74) *Attorney, Agent, or Firm* — Patterson + Sheridan, LLP

(57) ABSTRACT

Techniques for managing communications between access points and stations (STAs) are described herein. An access point broadcasts a trigger message to a plurality of STAs, the trigger message includes a matrix defining a plurality of resource units (RUs) that the plurality of STAs are assigned to transmit or receive data. The matrix accomplishes time division multiplexing by assigning timeslots to a plurality of STAs. The matrix accomplishes frequency division multiplexing by also assigning frequency tones to the plurality of STAs.

20 Claims, 7 Drawing Sheets

(51) Int. Cl.
*H04W 72/20* (2023.01)
*H04W 84/12* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 12,133,167 | B2* | 10/2024 | Siraj | H04W 52/0216 |
| 2013/0094479 | A1* | 4/2013 | Park | H04L 1/0027 |
| | | | | 370/336 |
| 2013/0208635 | A1* | 8/2013 | Roy | H04W 72/30 |
| | | | | 370/336 |
| 2017/0135124 | A1* | 5/2017 | Szymanski | H04W 52/20 |
| 2018/0027453 | A1* | 1/2018 | Viger | H04W 74/0816 |
| | | | | 370/336 |
| 2018/0255589 | A1* | 9/2018 | Patil | H04W 74/0816 |
| 2018/0263045 | A1* | 9/2018 | Zhou | H04W 72/12 |
| 2020/0260488 | A1* | 8/2020 | Cherian | H04W 56/001 |
| 2021/0211258 | A1* | 7/2021 | Thubert | H04W 74/085 |
| 2021/0315009 | A1* | 10/2021 | Xia | H04W 8/04 |
| 2022/0046719 | A1* | 2/2022 | Wang | H04W 76/10 |
| 2022/0141881 | A1* | 5/2022 | Bai | H04W 74/0833 |
| | | | | 370/329 |
| 2022/0225344 | A1* | 7/2022 | Fellhauer | H04W 72/121 |
| 2023/0345549 | A1* | 10/2023 | Elshafie | H04L 27/0008 |

FOREIGN PATENT DOCUMENTS

| | | | | |
|---|---|---|---|---|
| WO | WO-2019093788 | A1 * | 5/2019 | ............ H04W 72/30 |
| WO | 2020225280 | A1 | 11/2020 | |
| WO | WO-2022075896 | A1 * | 4/2022 | ........ H04W 52/0216 |
| WO | WO-2022151772 | A1 * | 7/2022 | ........ H04W 72/1263 |

OTHER PUBLICATIONS

Office Action—Notice of Intention to Grant for European Application No. 23182327.9, dated Oct. 21, 2024, 35 Pages.

European Search Report in European Patent Application No. 23182327. 9, dated Nov. 16, 2023, 6 Pages.

Yang A., et al., "Concept and Analysis of Capacity Entropy for Uplink Multi-User Media Access Control for the Next-Generation WLANs", Mobile Networks and Applications, Springer, US, New York, vol. 24, No. 5, Nov. 27, 2018, pp. 1572-1586, XP037052964, The Definition of CEM, p. 1576, paragraph 4—p. 1579.

* cited by examiner

FLEXIBLE-SLOT SCHEDULING FOR RAW DETERMINISTIC TRAFFIC

CROSS-REFERENCE TO RELATED APPLICATIONS

This application claims benefit of U.S. provisional patent application Ser. No. 63/368,001 filed Jul. 8, 2022. The aforementioned related patent application is herein incorporated by reference in its entirety.

TECHNICAL FIELD

Embodiments presented in this disclosure generally relate to techniques for managing Wi-Fi communications between access points (APs) and stations (STAs).

BACKGROUND

Wi-Fi technology has demonstrated substantial growth since the inception in 1990 of the 802.11 Project Authorization Request to develop medium access control and physical layer specification for wireless connectivity. The growth of Wi-Fi technology corresponds to increased Wi-Fi traffic driven by increases in the number of users, increasing data rates, and increases in the amount of data sent and received. Although Wi-Fi traffic continues to expand, the ability of Wi-Fi technology to meet the traffic demands is limited by available bandwidth. Wi-Fi operates on specific frequency bands that are shared by STAs and scheduled by APs. The next generation of Wi-Fi technology will rely on developments in scheduling traffic to reduce overhead and increase the amount of data that can be transferred.

The transmission of data within a Wi-Fi network is facilitated by APs. APs are devices that schedule the transmission of data to and from STAs. STAs are devices that use data sent over the Wi-Fi network to carry out specific tasks. Some examples of STAs include personal computers, cellular phones, and servers. Because Wi-Fi transmission are not bound to cables or wires, each STA is unaware of transmission by other STAs and each STA tends to be unaware of the busy/idle state of the APs. In early Wi-Fi development, the situation arose where each STA would transmit a data frame simultaneously to an AP. With each STA transmitting a data frame at the same time the AP is overwhelmed and would be unable to capture any single data frame. At the same time that the AP is overwhelmed, it is also underutilized because the AP does not have any data frames from any STAs to manage. This problem became known as collision.

To avoid constant collision of data frames, Wi-Fi STAs transmit a data frame and wait for an acknowledgement from the intended receiver that the data frame was received. If no acknowledgement is received, the STA can send the transmission again. The STA will repeatedly send transmission until an acknowledgement is received. There is a cost to repeatedly transmitting frames. Each retransmission attempt results in longer wait times between retransmissions that compound creating greater and greater overhead costs. The embodiments described herein are directed to a device, method, and computer readable medium that reduce collisions and reduce overhead that plague current Wi-Fi communications.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
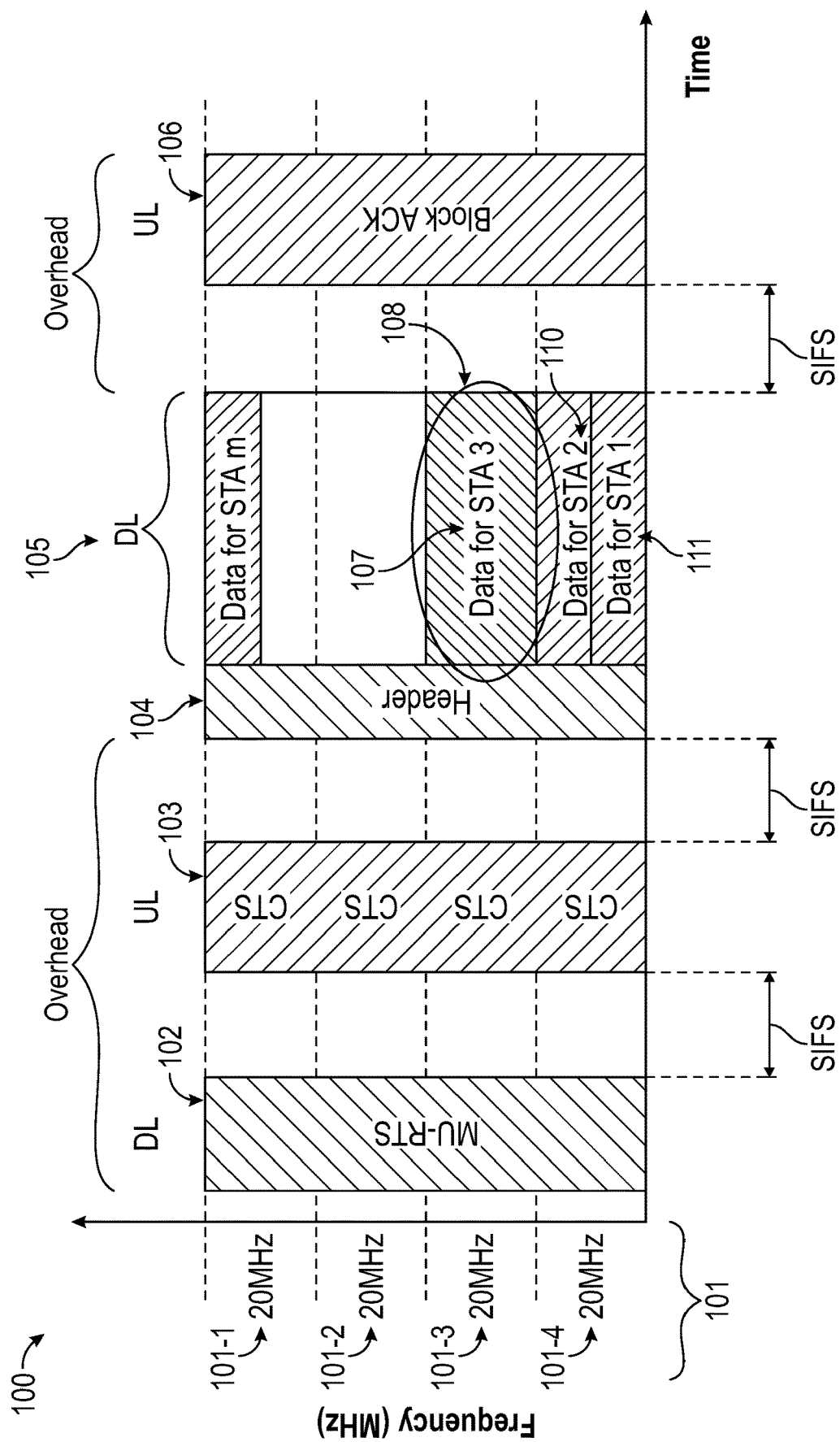
FIG. 1 illustrates a non-deterministic downlink transmission.

One embodiment presented in this disclosure is an AP that includes a transmitter configured to broadcast a trigger message to a plurality of STAs, the trigger message including a matrix defining a plurality of resource units (RUs) that the plurality of STAs are assigned in order to transmit or receive data simultaneously for a fixed duration. The matrix further defining a first timeslot in a first RU of the plurality RUs that is assigned to a first one of the plurality of STAs and a second timeslot in the first RU that is assigned to a second one of the plurality of STAs.

Another embodiment presented in this disclosure is a method that includes transmitting a trigger message to a plurality of STAs, the trigger message comprising a matrix defining a plurality of RUs that the plurality of STAs are assigned to transmit data simultaneously for a fixed duration, the matrix further defining a first timeslot in a first RU of the plurality RUs that is assigned to a first one of the plurality of STAs and a second timeslot in the first RU that is assigned to a second one of the plurality of STAs. The method also includes receiving data from the STAs using the RUs defined in the matrix.

Another embodiment presented in this disclosure is a computer product comprising logic encoded in a non-transitory medium, the logic executable by operation of one or more computer processors to perform an operation. The operation includes transmitting a trigger message, from an AP, to a plurality of STAs, the trigger message comprising a matrix defining a plurality of RUs that the plurality of STAs are assigned to transmit or receive data simultaneously for a fixed duration, the matrix further defining a first timeslot in a first RU of the plurality RUs that is assigned to a first one of the plurality of STAs and a second timeslot in the first RU that is assigned to a second one of the plurality of STAs.

Example Embodiments

Wi-Fi communication includes extensive overhead to coordinate the movement of data among STAs and APs. For example, Wi-Fi systems can use clear to send (CTS) messages, request to send (RTS) messages, and acknowledge messages to co-ordinate data transmissions. A CTS message is transmitted by a STA in response to a RTS message. The CTS message silences all wireless STAs in its vicinity and enables the sender of the RTS message to begin data transfer. The cost of this solution is large overhead. Sending CTS messages, RTS messages, and acknowledge messages costs time and bandwidth. Each message increases the amount of time consumed prior to sending an actual data frame. Also, the transmission of each message and the processing of the received message by the recipient consumes memory space, processor resources, and electrical energy. In today's world of constant connection, digital downloads, and social media these costs impose real penalties on the ability of WIFI networks to meet the demands of data transmission networks.

The embodiments described herein overcome these inefficiencies by deterministically transferring data. A time-division and frequency division scheduling matrix allows for the deterministic transfer of data. This flexible scheduling matrix provides complete information to an AP that details the STA that is sending an amount of data and when that data will be sent. Therefore, the deterministic scheduling matrix fully defines when a data packet will arrive at an AP, the time when the data packet will arrive, and the resource unit (RU) carrying the data packet. The embodiments described herein increase the flexibility and density of data frames, eliminating overhead, and provide greater reliability.

FIG. 1 illustrates a non-deterministic downlink transmission 100. A non-deterministic transmission is a Wi-Fi transmission where the AP and STAs are not given a scheduling defining data transmissions by time and RU. Current Wi-Fi communication hardware relies on non-deterministic devices and methods to facilitate communication between STAs and APs. Non-deterministic down-link transmission 100 includes a multi-user request to send (MU-RTS) message 102, a CTS message 103, a header 104, multi-user download frame 105, and a block acknowledgement 106.

For non-deterministic downlink transmission 100, an AP can first send a MU-RTS 102, indicating for each target STA (STA-1, STA-2, STA-3, etc.) the RU 101-1 thru 101-4 the AP is going to use to transmit. For example, for target STA 3 (STA-3) the AP is going to transmit on RU 101-3. For example, a RU is a specific amount of frequency bandwidth that is allocated to a particular wireless device for communication.

The target STAs respond in parallel in a multi-user response, indicating CTS 103 to acknowledge the announced downstream transmission. The AP then sends a multi-user downlink frame 105 with the target data in the announced resource for each STA. The target data (e.g., target data 107) consumes the entire RU allocated for each STA. For example, the target data 107 for RU 101-3 utilizes the entire resource 108 for RU 101-3 assigned for multi-user data frame 105. In this embodiment, the entire time period allocated to the RU for the data frame is allocated to a single STA. Although in this example a STA is allocated the full time for a RU, a STA can be allocated a division of the frequency bandwidth. For example, within data frame 105, data for STA 2 110 and data for STA 1 111 are allocated bandwidth of the RU that is split by frequency but occupies the entire timeslot. The data for STA 1 and STA 2 cannot occupy less than the full time for RU 101-4. After the transmission completes, the AP sends a block acknowledgement request (not depicted) to confirm if each client received the transmission successfully. If the data frames were received successfully, the clients respond with a block acknowledgement 106 in parallel. For non-deterministic downlink transmission, the MU-RTS 102, CTS 103, block acknowledgement request, and block acknowledgement are overhead consuming system resources, bandwidth, and time.

Figure 2:
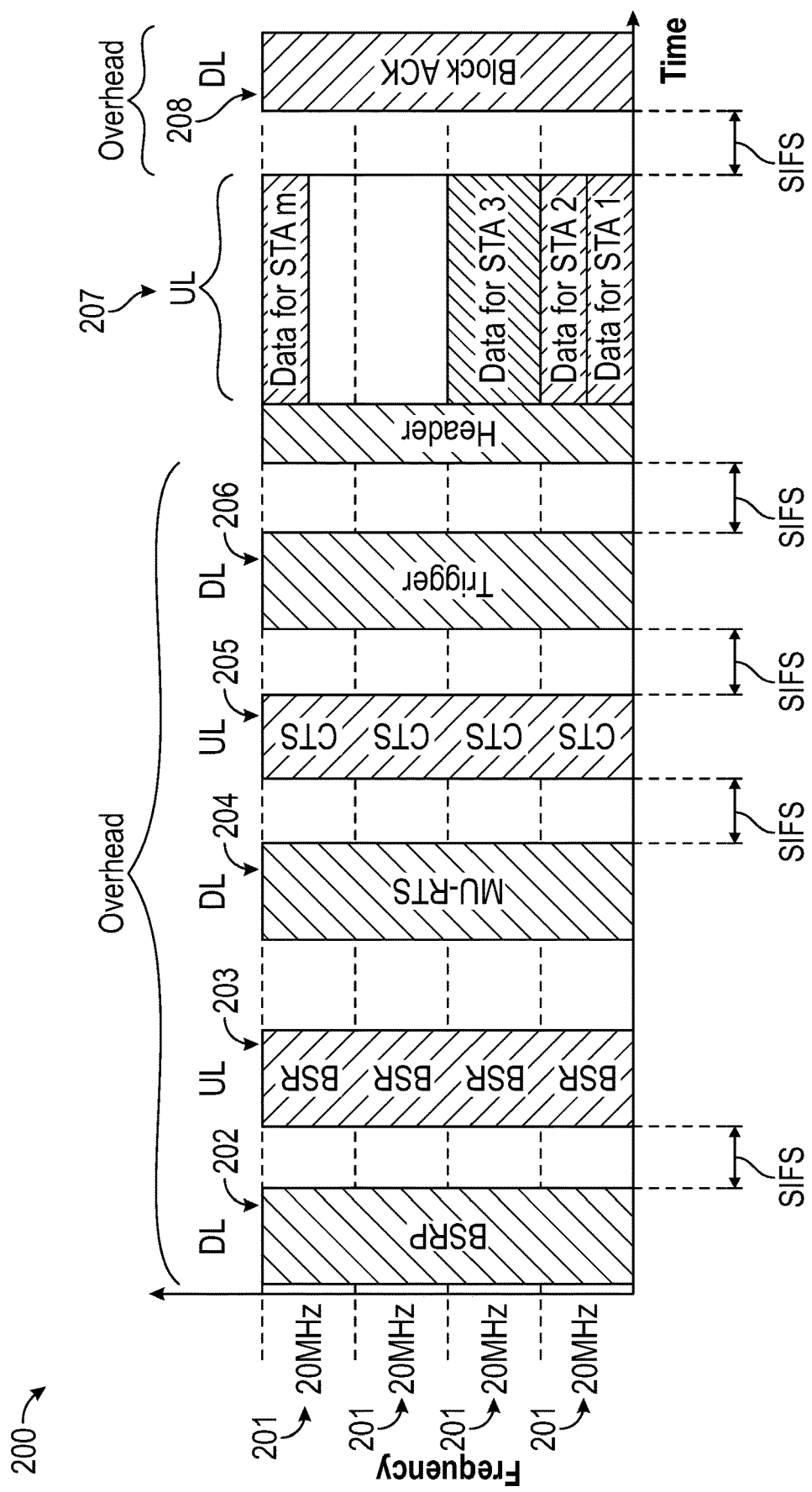
FIG. 2 illustrates a non-deterministic uplink transmission.

FIG. 2 illustrates non-deterministic uplink transmission 200. For non-deterministic uplink transmissions 200, an AP is expected to first obtain the BSR 203 for all STAs. The BSR 203 can be sent individually by each STA with a single user uplink frame. In this example, the single user uplink frame consumes the entire channel. The BSR can also be clubbed in another uplink aggregate MAC protocol data unit (AMPDU). The AP can also send a request to a set of target STAs (BSR Poll) 202, allocating to each one a RU 201 to return their BSR 203. In one embodiment, the STAs respond in parallel in a MU-RTS response 204.

The AP then knows which STA has which traffic to send. In response, the AP sends a MU-RTS frame 204 to the target clients, with the allocation of RUs 201 for their data transmission. All STAs respond in parallel in a multi-user response, indicating CTS 205 to acknowledge the allocated upstream RUs. The AP then sends a trigger frame 206 to start each client transmission. The target clients can respond in parallel with data in their respective RU 207. If the data frames were received successfully, the AP responds with a group block acknowledgement 208. Each of the BSR Poll 202, the BSR 203, the MU-RTS 204, CTS 205, and trigger frame 206 represent overhead consuming time and bandwidth.

In a non-deterministic system, uplink (UL) and downlink (DL) transmissions require multiple rounds of transmission creating inefficiencies and wasting resources. This occurs because the size of the STA transmission is not known to the AP. The coordination of non-deterministic systems, therefore, includes a large overhead to communicate the data that is sent. This overhead includes communication in the form buffer status report polling (BSRP), BSR, MU-RTS, CTS, and a trigger message. Embodiments herein improve both UL and DL transmissions by eliminating overhead, reducing congestion losses, and decreasing jitter.

Figure 3:
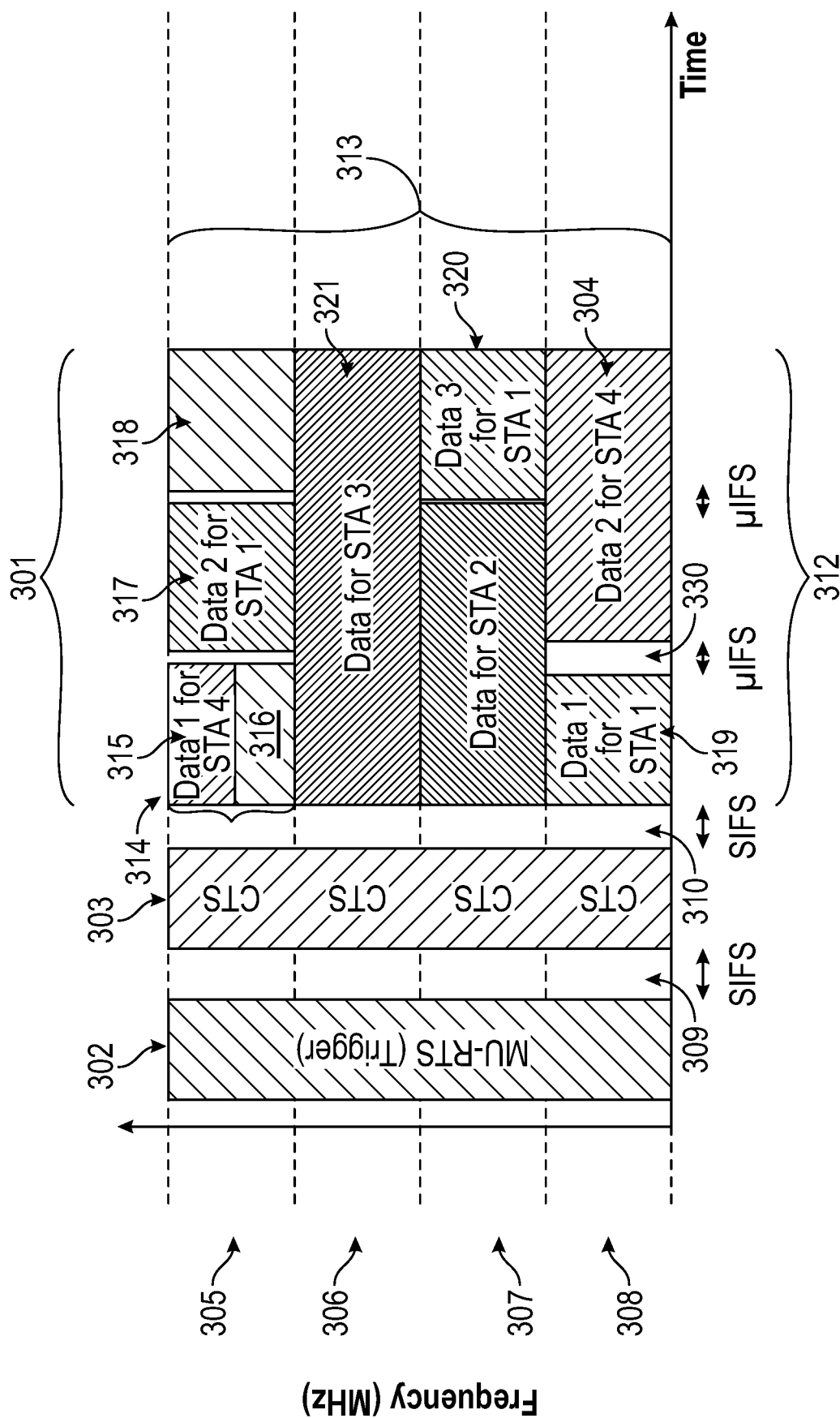
FIG. 3 illustrates deterministic data communication according to an embodiment of the current disclosure.

FIG. 3 illustrates deterministic data communication, according to one embodiment. The devices and methods described herein are designed to overcome the inflexibility, inefficiencies, and problems of current WIFI communications. The embodiment described herein includes an optional MU-RTS trigger 302, an optional CTS message 303, and a matrix 301. The MU-RTS trigger 302 may be separated from the CTS message 303 by a short inter-frame space (SIFS) 309 and 310. SIFS denote the amount of time in microseconds used by a wireless interface to process a received frame. The CTS message 303 may also be separated from the matrix 301 by a second SIFS 310. Timeslots can be assigned to one STA in isolation or in sequence. When timeslots are assigned in sequence, the STA can transmit continuously from one timeslot to another, without stopping the transmission.

The embodiments herein reduce overhead and improve the efficiency of data frame transmission. The time and frequency matrix 301 includes a plurality of time windows, aligned in a time division multiplexing (TDM) fashion. Each time window includes time offsets. The size of the time offsets corresponds with an amount of time used to transmit the corresponding data frame. The embodiments described herein are not limited to a single offset size. This allows the embodiments described herein to customize the size of the timeslot to the size of the data frame. RUs 305-308 denote groups of bandwidth subcarriers (tones). Therefore, the matrix 301 has a height described by a plurality of RUs 305-308 and a width described by time. Although FIG. 3 denotes four RUs, the number of RUs within the matrix depends upon the bandwidth of the transmission signal. For example, there may be a maximum of 9 RUs for 20 MHz bandwidth and 18 RUs for 40 MHz bandwidth. Further divisions of bandwidth into RUs are defined in IEEE 802.11. Thus the AP can schedule several consecutive transmit (XMIT) opportunities (TXOPs) with a single trigger frame.

The matrix 301 is a two-dimensional deterministic data frame for transmitting data. MU-RTS trigger 302 includes a schedule for transmitting the data that corresponds to matrix 301. The schedule for sending a data frame from one or more APs and for receiving a data frame by one or more APs is transmitted as a MU-RTS trigger. The schedule corresponding with the matrix 301 is shared between receiving and transmitting APs to coordinate the transmission of data. Accordingly, the MU-RTS trigger 302 reflects the content and size of a corresponding data frame described by matrix 301.

The matrix 301 has depth 313 and width 312. The matrix's depth 313 is measured in frequency (MHz). The frequency division reflects the bandwidth for each RU 305-308. For example, each of RUs 305-308 may be a 20 MHz band. Additional bands for RUs 305-308 such as 40 MHz, 80 MHz, and 160 (80+80) MHz can also be utilized.

Each of the RUs 305-308 can be further sub-divided by frequency into smaller frequency bands. For example, the first matrix entry 314 for RU 505 is sub-divided into a first smaller frequency band 315 and a second smaller frequency band 316.

RUs 305-308 can also be further sub-divided into individual timeslots. For example, RU 305 schedules timeslot Data 1 for STA 4 315 at a first time period, timeslot Data 2 for STA 1 317 at the next time period, and a third timeslot 318 where no data transmission is scheduled. Each timeslot is separated by a micro-inter frame space (μIFS) 330. Together Data 1 for STA 4 315, Data 2 for STA 1 317, the μIFSs 330, and the empty set timeslots consume the allocated resource for RU 305.

The schedule and corresponding matrix 301 allows flexibility with response to a size of the data packets and the corresponding timeslot that can be transmitted. This permits the AP to schedule a data packet for a particular STA that is less than the entire time allocated to the RU. The schedule and matrix 301 include subdivisions for each RU. For example, the time scheduled for Data 1 for STA 4 is less time than Data 2 for STA 4 305 scheduled in RU 308. In contrast, the transmission schemes illustrated in FIGS. 1 and 2 would utilize the entire time period allotted to RU 305 to transmit or receive Data 1 for STA 4. Similarly, the transmission illustrated in FIGS. 1 and 2 would require Data 2 for STA 4 to consume the entire time allotted to RU 308. Therefore, matrix 301 defines a schedule for data transmission where data packets are assigned both a RU and timeslot in a more efficient manner permitting a single data frame to be more densely packed with data and allowing a greater number of data packets to be sent.

Because the schedule for the transfer of data transmitted before the data is transferred, the receiving AP can identify each data packet as it arrives by the time of arrival and the RU it arrives on. Similarly, a sending AP can have a matching schedule that permits it to synchronize the transmission of the data, according to the scheduling matrix. When the schedule is received by an AP that will receive the data scheduled by matrix 301, the AP has a complete picture of the sequences of data, when each data packet will arrive, and the RU that will send the data. Therefore, each AP is able to efficiently and effectively coordinate the sending and receiving of data packets without the BSR polls 202, BSRs 203, and trigger frame 206. In one embodiment, the matrix 301 operates as a pull-trigger that lists traffic the AP receives and the time the traffic arrives at the AP. The matrix 301 indicates to the AP which RU and a time offset for the flow of data packets arriving at the AP according to the deterministic schedule included with MU-RTS trigger 302.

For example, FIG. 3 depicts a consecutive timeslot transmission for STA 3. Data for STA 3 321 occupies a single RU spanning the width of the time and frequency matrix 301. FIG. 3 also depicts a non-contiguous transmission for STA 1. Data 1 for STA 1 319 is non-contiguous with respect to time with Data 2 for STA 1 317, and is not contiguous with respect to time with Data 3 for STA 1 320. Note that the data for STA 3 is also non-contiguous in both time and frequency. Data 1 for STA 1 319 occupies a different RU from Data 2 for STA 1 317 and from Data 3 for STA 1 320. The present disclosure permits division of scheduling for any STA with respect to both time and frequency. This allows for a more efficient data transfer by allowing the AP to fully utilize the entirety of a data frame.

The embodiments described herein improve the prior art by limiting overhead and improving the efficiency of data frame transmission. The time and frequency matrix 301 with a number of consecutive time windows, aligned in a time division multiplexing (TDM) fashion having specified time offsets. RUs 305-308 denote groups of bandwidth subcarriers (tones). The matrix has a height described by a plurality of RUs 305-308 and a width described by time. Although FIG. 3 denotes four RUs, the number of RUs within the matrix depends upon the bandwidth of the transmission signal. For example, there may be a maximum of 9 RUs for 20 MHz bandwidth and 18 RUs for 40 MHz bandwidth. Further divisions of bandwidth into RUs are defined in IEEE 802.11. Thus the AP can schedule several consecutive transmit opportunities with a single trigger frame.

Figure 4:
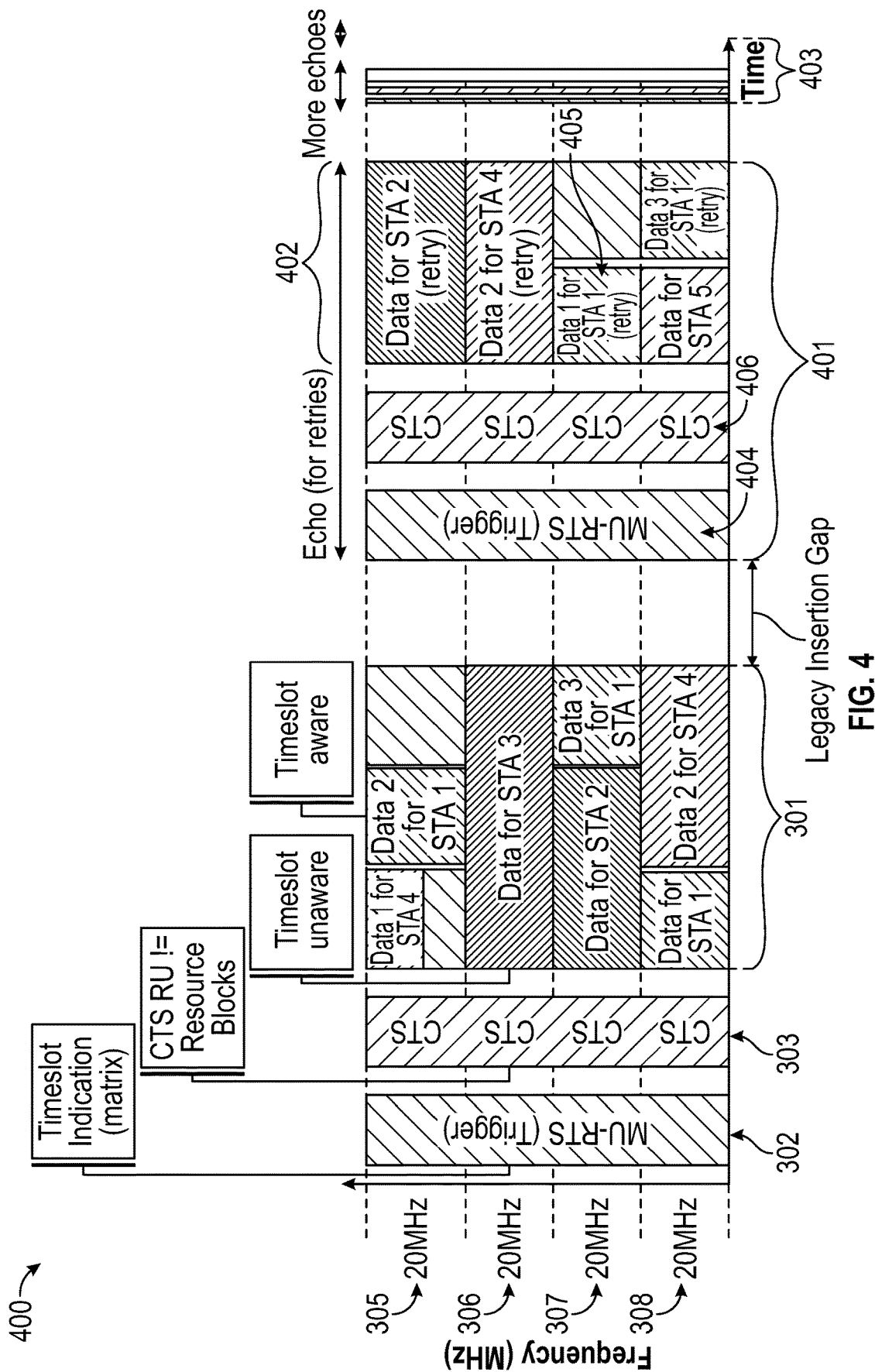
FIG. 4 illustrates a deterministic data communication re-transmitted data according to an embodiment of the current disclosure.

FIG. 4 illustrates an additional embodiment 400. FIG. 4 incorporates the entirety of FIG. 3 along with a mechanism for re-transmission of any lost data. Data transmissions scheduled by matrix 301 may be lost due to many factors. It is desirable that deterministic traffic be able to overcome losses to provide reliability. Deterministic traffic does not mean that delivery has to be guaranteed, but that the delivery time should be known. The present embodiment addresses transmission loss by re-transmission of any lost data. A re-transmission 401 may also be known as an echo. The AP is aware of the deterministic schedules in the matrix 301 and the affordable amount of jitter. An additional transmission matrix 402 may be sent within the time set by acceptable jitter times. Therefore, additional triggers may be sent, to pull again the deterministic packets that were lost.

Re-transmission is accomplished by following the initial data frame with a second MU-RTS trigger 404 scheduling the transmission of additional data frames 403. A block acknowledgement message informs that AP of any data packets requiring re-transmission. An additional CTS 406 may also be sent. The second MU-RTS trigger 404 schedules for transmission the data frames included within matrix 402. The second matrix 402 may be sent with the same MU-RTS trigger 302 as the initial transmission or it may be sent with its own MU-RTS trigger 404. For deterministic traffic, a trigger 404 is sent periodically at the granularity of the deterministic service, and the STAs response includes the top of queue packets and the RU size needed. Queued packets can be assigned to the matrix by priority with deterministic packets assigned the highest priority. The AP sorts the packets, assign the most important packets, and allocates RUs according to the needs of the packet assigned for re-transmission. Because the AP is aware of multiple deterministic schedules and the AP is aware of the amount of time for affordable jitter, the AP can pack more than one flow in one trigger. The second matrix 402 and any additional data frames 403 include previous traffic that was not received. When several retry matrices are sent in sequence (e.g., several echoes), each time there are less missing packets so the matrix can be shorter in time as illustrated in FIG. 4. Any additional re-transmissions or data frames 403 include an MU-RTS trigger, CTS, and matrix as described herein.

The embodiments described herein illustrate the flexibility of the scheduling matrix included within the MU-RTS trigger. For example, the Data 1 and Data 3 for STA 1 require re-transmission. In the initial matrix, Data 1 for STA 1 319 was assigned transmission on RU 308. In the re-transmission 401, Data 1 for STA 1 405 can be assigned any RU that has a timeslot available for re-transmission. As depicted in FIG. 4, rather than scheduling the transmission of Data 1 for STA 1 on RU 308, the re-transmission is scheduled for RU 307. Here, the AP is not constrained to re-schedule transmission on the same RU initially assigned to Data 1 for STA 1. Instead the AP can use any available RU. In this way, the AP can maximize the data frames for re-transmission which efficiently packs data transmissions into available resources.

The second re-transmission 401 or additional data frames 403 can also be used opportunistically to schedule data frames for a first transmission. As illustrated in FIG. 4, re-transmission 401 includes a first transmission for Data for STA 5. Because the schedule for transmission is included in MU-RTS trigger 404, an AP can assign any RU having an available timeslot.

Re-transmission efficiently allocates resources by decreasing the size of the corresponding matrix. For example, the time to transmit the data in matrix 402 is less than the amount of time to transmit in matrix 301. By reducing the amount of time used to re-transmit additional data frames, re-transmissions 401 and data frames 403 consume less time and less resources. This permits re-transmission of any lost data within the amount of affordable jitter as well.

Figure 5:
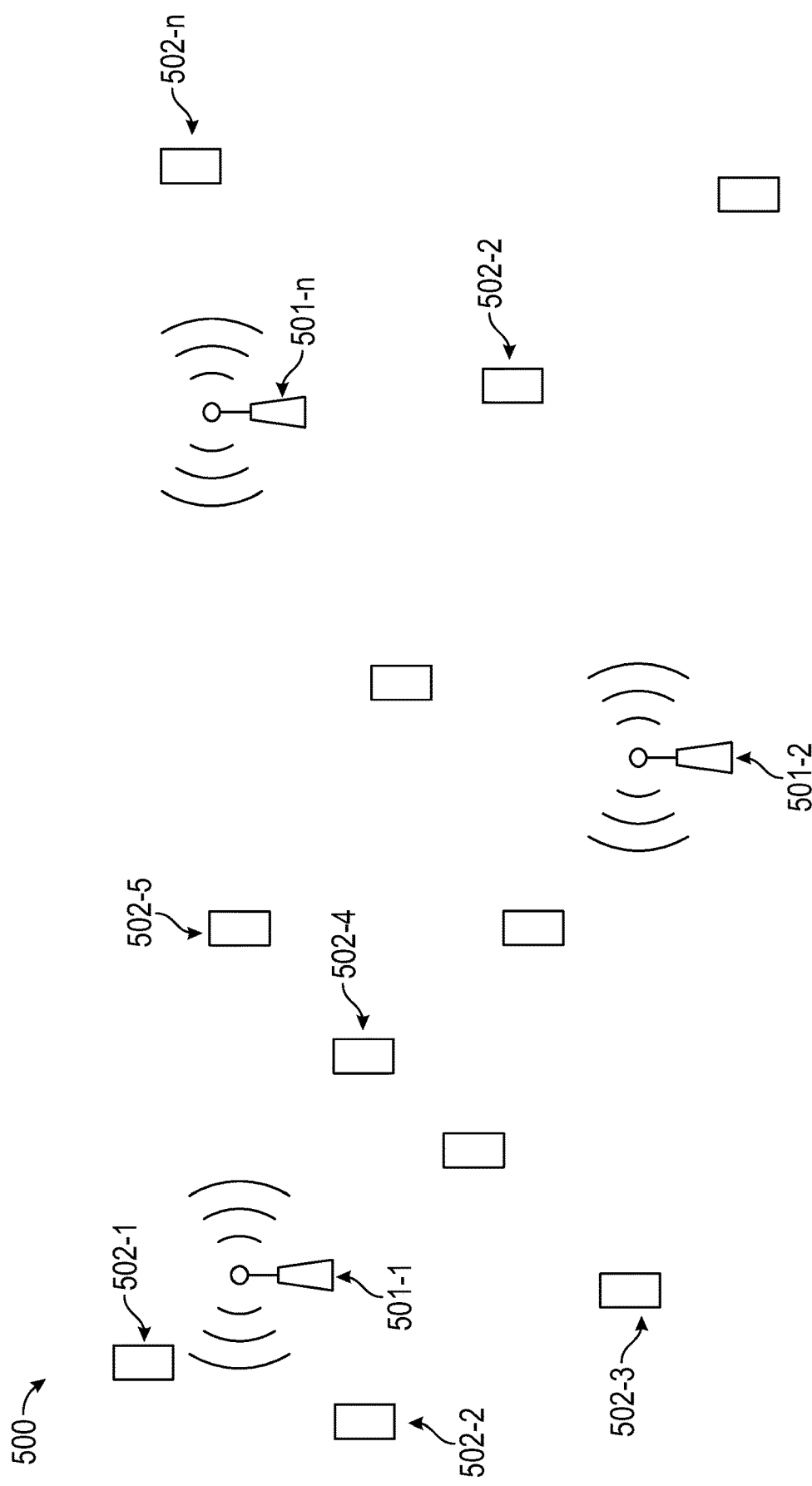
FIG. 5 illustrates a wireless network according to an embodiment of the current disclosure.

FIG. 5 illustrates an additional embodiment. FIG. 5 uses the value "n". The value "n" indicates that there are a finite number of items but also that there are numerous items. The use of the value "n" is consistent with its application in mathematics to designate a large but finite number of items. For example, FIG. 5 designates a third AP as "501-*n*." The use of "501-*n*" indicates that the number "n" includes a number of APs that can exceed three but is a defined number of numerous APs. APs 501-1 thru 501-*n* and STAs 502-1 thru 502-*n* form a wireless network 500. Although three APs are depicted in FIG. 5, any finite number of APs can be deployed in wireless network 500. AP 501-1 communicates with STAs 502-1 thru 502-5. Although five STAs are depicted as communicating with AP 501-1 any finite number of STAs can communicate each of the APs. An AP and its associated STAs can form a node in the larger wireless network 500. APs 501-1 thru 501-*n* schedule data transmissions from STAs 502-1 thru 502-*n* as described in FIGS. 3 and 4 and set forth herein. For example, AP 501-1 deploys the data transmission scheme set forth in FIG. 3. AP 501-1 can schedule the plurality of transmit opportunities with an optional MU-RTS trigger 302, an optional CTS message 303, and a matrix 301. The MU-RTS trigger 302 may be separated from the CTS message 303 by a short inter-frame space (SIFS) 306. SIFS denote the amount of time in microseconds for a wireless interface to process a received frame. The CTS message 303 may also be separated from the matrix 301 by a second SIFS 306. In the event that an transmissions are lost, APs 501-1 thru 501-*n* and STAs 502-1 and 502-*n* can re-transmit data as described with respect to FIG. 4 and as set forth herein.

Figure 6:
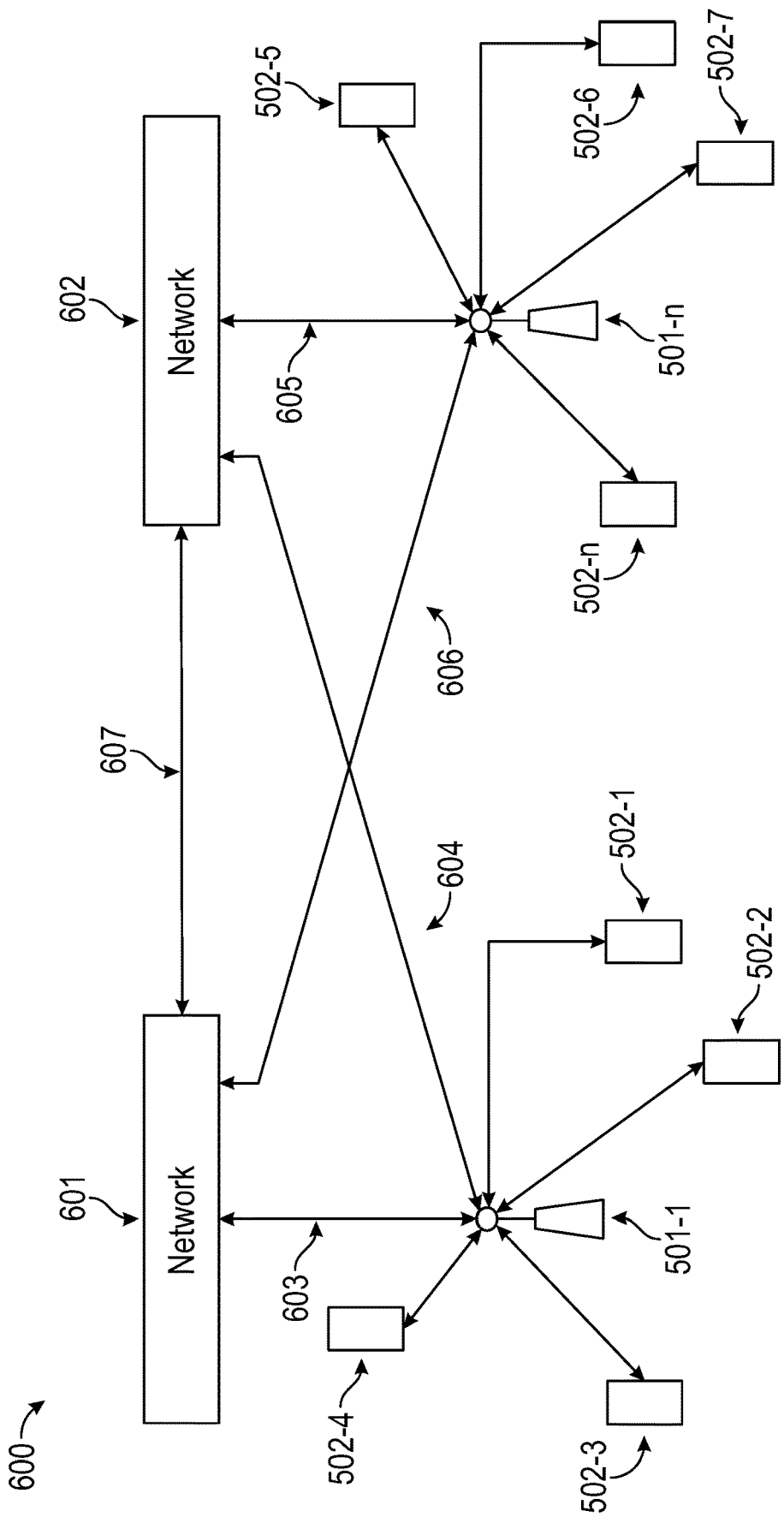
FIG. 6 illustrates a communication network according to an embodiment of the current disclosure.

FIG. 6 illustrates an additional embodiment. APs 501-1 thru 501-*n* and STAs 502-1 and 502-*n* may also be part of a larger communication network 600. APs 501-1 thru 501-*n* and STAs 502-1 thru 502-*n* form a wireless network 500. An AP and its associated STAs can form a node in the larger wireless network. APs 501-1 thru 501-*n* schedule data transmissions from STAs 502-1 thru 502-*n* as described in FIGS. 3 and 4 and set forth herein. Each of APs 501-1 thru 501-*n* can communicate with networks 601 and 602. For example, AP 501-1 communicates with network 601 through communication medium 603. AP 501-1 can also communicate with network 602 through communication medium 604. Similarly, AP 501-*n* can communication with network 602 through communication medium 605 and can also communicate with network 601 through communication medium 606. Finally, Networks 601 and 602 can communicate with each other through communication medium 607. Networks 601 and 602 include the hardware and software necessary to form a network for data transmission. For example, networks 601 and 602 include hardware such as routers, switches, transmission lines, data centers, severs, and other hardware necessary to form a communication network. Networks 601 and 602 also include all necessary hardware for APs and STAs to connect to and communicate over the Internet. Communication mediums 603, 604, 605, 606, and 607 can be either wireless or wired.

By increasing the flexibility and density of the data frames, eliminating overhead, and increasing the determinism of the data frames the embodiment described herein are an improvement over known systems and methods. These goals are reached by scheduling that uses a flexible scheduling matrix to provide complete information to an AP that explains who is sending what data and when that data will be sent.

Figure 7:
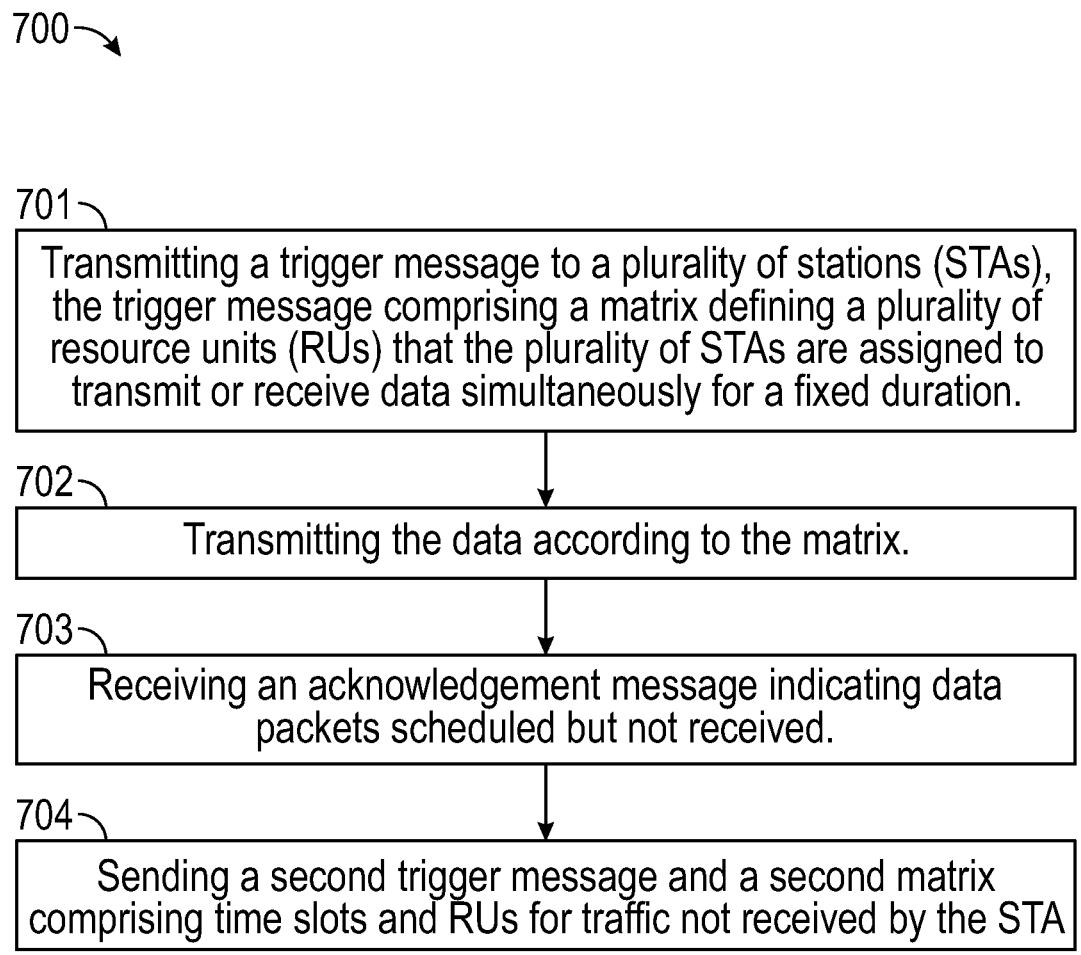
FIG. 7 illustrates a method according to an embodiment of the current disclosure.

FIG. 7 illustrates a method 700 embodiment of the device set forth in FIGS. 3 and 4. Method 700 includes the elements in FIGS. 3 and 4. At block 701 a trigger message 302 is transmitted to a plurality of STAs 502-1 thru 502-*n*, the trigger message 302 includes a matrix 301 defining a plurality of RUs 305-308 that the plurality of STAs 502-1 thru 502-*n* are assigned to transmit or receive data simultaneously for a fixed duration. At block 702, the scheduled data is transmitted according to the matrix 301. At block 703, AP 501-1 receives an acknowledgement message indicating data packets scheduled but not received. At block 704, AP 501-1 sends a second trigger message 404 and a second matrix 402 comprising timeslots and RUs for traffic not received by the STA.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the blocks of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An access point (AP) comprising:
a transmitter configured to broadcast a trigger message to a plurality of stations (STAs), the trigger message comprising a matrix defining a plurality of resource units (RUs) that the plurality of STAs are assigned in order to transmit or receive data simultaneously for a fixed duration, the matrix further defining a first timeslot in a first RU of the plurality RUs that is assigned to a first STA of the plurality of STAs and a second timeslot in the first RU that is assigned to a second STA of the plurality of STAs.

2. The AP of claim 1, wherein the trigger message comprises a multi-user request to send (MU-RTS) frame.

3. The AP of claim 1, wherein the matrix further defines a third timeslot in a second RU of the plurality of RUs that is assigned to the first STA, wherein the first and third timeslots are non-overlapping.

4. The AP of claim 3, wherein data transmission for the first STA is split into a first portion assigned to the first timeslot and a second portion assigned to the third timeslot.

5. The AP of claim 1, wherein the AP is configured to receive acknowledgement of traffic received by the plurality of STAs after the fixed duration has ended, and, for traffic not received by the STA, the AP sends a second trigger message and a second matrix comprising timeslots and RUs for traffic not received by the STA.

6. The AP of claim 5, wherein at least one timeslot of the plurality of RUs is shared by two or more STAs.

7. The AP of claim 1, wherein the matrix comprises time division multiplexing and frequency division multiplexing.

8. A method, comprising:
transmitting a trigger message to a plurality of stations (STAs), the trigger message comprising a matrix defining a plurality of resource units (RUs) that the plurality of STAs are assigned to transmit data simultaneously for a fixed duration, the matrix further defining a first timeslot in a first RU of the plurality RUs that is assigned to a first STA of the plurality of STAs and a second timeslot in the first RU that is assigned to a second one of the plurality of STAs, and
receiving data from the STAs using the RUs defined in the matrix.

9. The method of claim 8, wherein the trigger message comprises a multi-user request to send (MU-RTS) frame.

10. The method of claim 8, wherein the matrix further defines a third timeslot in a second RU of the plurality of RUs that is assigned to the first STA, wherein the first and third timeslots are non-overlapping.

11. The method of claim 10, wherein data transmission for the first STA is split into a first portion assigned to the first timeslot and a second portion assigned to the third timeslot.

12. The method of claim 8, further comprising receiving an acknowledgement of traffic received by the plurality of STAs after the fixed duration has ended, and, for traffic not received by the first STA, sending a second trigger message and a second matrix comprising timeslots and RUs for traffic not received by the first STA.

13. The method of claim 12, wherein at least one timeslot of the plurality of RUs is shared by two or more STAs.

14. The method of claim 8, wherein the matrix comprises time division multiplexing and frequency division multiplexing.

15. A computer product comprising logic stored in a non-transitory computer-readable storage medium, the logic executable by operation of one or more computer processors to perform an operation comprising:
transmitting a trigger message, from an AP, to a plurality of stations (STAs), the trigger message comprising a matrix defining a plurality of resource units (RUs) that the plurality of STAs are assigned to transmit or receive data simultaneously for a fixed duration, the matrix further defining a first timeslot in a first RU of the plurality RUs that is assigned to a first STA of the plurality of STAs and a second timeslot in the first RU that is assigned to a second one of the plurality of STAs.

16. The computer product of claim 15, wherein the trigger message comprises a multi-user request to send (MU-RTS) frame.

17. The computer product of claim 15, wherein the matrix further defines a third timeslot in a second RU of the plurality of RUs that is assigned to the first STA, wherein the first and third timeslots are non-overlapping.

18. The computer product of claim 17, wherein data transmission for the first STA is split into a first portion assigned to the first timeslot and a second portion assigned to the third timeslot.

19. The computer product of claim 15, further comprising receiving by the AP an acknowledgement of traffic received by the plurality of STAs after the fixed duration has ended, and, for traffic not received by the first STA, the AP sends a second trigger message and a second matrix comprising timeslots and RUs for traffic not received by the first STA.

20. The computer product of claim 15, wherein the matrix comprises time division multiplexing and frequency division multiplexing.

* * * * *